United States Patent [19]

Christman

[11] Patent Number: 4,605,725
[45] Date of Patent: * Aug. 12, 1986

[54] POLYURETHANE SEALANT COMPOSITIONS AND THEIR USE AS THERMAL-BREAK SEALANTS

[75] Inventor: Donald L. Christman, Grosse Ile, Mich.

[73] Assignee: BASF Corporation, Wyandotte, Mich.

[*] Notice: The portion of the term of this patent subsequent to Nov. 26, 2002 has been disclaimed.

[21] Appl. No.: 671,454

[22] Filed: Nov. 14, 1984

[51] Int. Cl.⁴ .............................................. C08G 18/32
[52] U.S. Cl. ....................................... 528/77; 49/507; 49/DIG. 1; 273/63 R
[58] Field of Search ....................... 528/77, 78; 49/507, 49/DIG. 1; 273/63 R

[56] References Cited

U.S. PATENT DOCUMENTS

| | | | |
|---|---|---|---|
| 3,450,653 | 6/1969 | McClellan | 524/789 |
| 3,467,605 | 9/1969 | Abercrombie et al. | 273/63 R |
| 3,484,517 | 12/1969 | Ligon et al. | 524/874 |
| 3,890,255 | 6/1975 | van Leuwen et al. | 521/163 |
| 4,514,943 | 5/1985 | Jentoft et al. | 49/DIG. 1 |

*Primary Examiner*—Maurice J. Welsh
*Attorney, Agent, or Firm*—Norbert M. Lisicki

[57] ABSTRACT

The invention relates to polyurethane sealant compositions prepared by reacting a polyether polyol other than one derived from monoethanolamine, an alkylene oxide adduct of monoethanolamine, optionally pigment, catalyst and inorganic filler, and an organic polyisocyanate. The compositions are useful as thermal break sealants and in the manufacture of bowling balls.

19 Claims, No Drawings

POLYURETHANE SEALANT COMPOSITIONS AND THEIR USE AS THERMAL-BREAK SEALANTS

BACKGROUND OF THE INVENTION

1. Field of the Invention

This invention pertains to the preparation of noncellular polyurethane sealant compositions containing alkylene oxide adducts of monoethanolamine.

2. Description of the Prior Art

Those skilled in the art know that polyurethane sealant compositions can be prepared by mixing a polyol with an inorganic filler and reacting the mixture with a polyisocyanate. U.S. Pat. Nos. 3,450,653 and 3,484,517 are two examples of patents which disclose this teaching. The sealants disclosed in the prior art, however, have limited utility because their physical properties, such as tensile strength, hardness, brittleness, heat distortion, impact strength, and shrinkage resistance, have values which, although desirable for some uses, make them undesirable for other uses.

This application relates to polyurethane sealants which have good impact strength and high tensile and flexural strengths. The sealants are prepared by mixing a polyoxyalkylene polyether polyol other than one derived from monoethanolamine with an alkylene oxide adduct of monoethanolamine. The mixture is reacted with an organic polyisocyanate to form the polyurethane sealant. The prior art does not disclose this combination of ingredients or the significance of the combination.

SUMMARY OF THE INVENTION

Polyurethane sealants disclosed in the prior art have limited utility because one or more of their properties, such as tensile strength, hardness, brittleness, heat distortion, impact strength, and shrinkage have values which, although desirable for some uses, make them undesirable for other uses. This problem was solved by developing a polyurethane sealant composition prepared by (a) mixing a polyoxyalkylene polyether polyol other than one derived from monoethanolamine,
(b) an alkylene oxide adduct of monoethanolamine,
(c) optionally pigment, catalyst and inorganic filler, and
(d) reacting the mixture with an organic polyisocyanate.

The polyurethane sealants thus prepared have good impact and high tensile and flexural strength characteristics.

They can be used for patching floors and roads, to make castings of wheels and rollers, as heat barriers in the manufacture of metal windows and door frames, and in the manufacture of bowling balls.

DESCRIPTION OF THE PREFERRED EMBODIMENTS

The polyurethane sealants which are the subject matter of this invention are prepared by reacting a mixture of (a) a polyoxyalkylene polyether other than one derived from monoethanolamine,
(b) an ethylene oxide, propylene oxide adduct of monoethanolamine having a molecular weight range from about 200 to about 500,
(c) optionally pigment, catalyst, and inorganic filler, with an organic polyisocyanate.

The ratio of polyether polyol to the adduct of monoethanolamine is from about 2.5:1 to about 1:1.5, preferably 1:1.

The polyoxyalkylene polyether polyol or polyether blend which are employed in the subject invention are well known in the art and are generally referred to as polyoxyalkylene polyether polyols. These polyols are prepared by the reaction of an alkylene oxide with a polyhydric compound. Alkylene oxides which may be employed in the preparation of the polyols of the present invention include ethylene oxide, propylene oxide, the isomeric normal butylene oxides, hexylene oxide, octylene oxide, dodecene oxide, methoxy and other alkoxy propylene oxides, and cyclohexene oxide. Styrene oxide may also be employed. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed.

The polyoxyalkylene polyether polyols may have either primary or secondary hydroxyl groups and preferably are prepared from alkylene oxides having from 2 to 8 carbon atoms and may have molecular weights from about 400 to about 10,000. The polyoxyalkylene polyether glycol may be prepared by any known process such as, for example, the process disclosed by Wurtz in 1859 and Encyclopedia of Chemical Technology, Vol. 7, pages 257–262, published by Interscience Publishers, Inc. (1951) or in U.S. Pat. No. 1,922,459.

Polyhydric compounds which may be reacted with the alkylene oxides to prepare the polyalkylene ether polyols employed in the subject ivention include ethylene glycol, propylene glycol, diethylene glycol, dipropylene glycol, the isomeric butylene glycols, 1,5-pentane diol, 1,6-hexanediol, glycerol, trimethylolpropane, 1,2,6-hexanetriol, pentaerythritol, sorbitol, sucrose and alpha-methyl glycoside.

The alkylene oxide adduct of monoethanolamine is prepared by reacting ethylene oxide and propylene oxide with monoethanolamine, preferably in the presence of an alkaline catalyst. This catalyst may be potassium hydroxide, sodium hydroxide, sodium and potassium methylate and other catalyst well known to those skilled in the art. The quantity of ethylene and propylene oxide employed is such that the molecular weight of the adduct may vary from about 200 to about 500. The ethylene oxide content may range from about 5 percent to about 50 percent based on the total weight of the adduct.

Inorganic fillers may be employed in an amount which is from 0.15 part to 0.7 part by weight per part of polyether polyol. Inorganic mineral fillers which can be used to mix with the polyether polyols are selected from the group consisting of calcium silicate, aluminum silicate, magnesium silicate, calcium carbonate and mixtures thereof. One of the functions served by the mineral filler is to reduce shrinkage of the sealant.

If too much filler is added, however, the viscosity of the mixture will be too high at room temperature. This will make it difficult to mix the polyol-filler component with the isocyanate component. The temperature of the polyol-filler component can be elevated to temperatures of 120° F. to decrease its viscosity and to promote better mixing with the isocyanate component. The viscosity of the polyol-filler component is also dependent upon the filler used. Calcium silicate will provide polyol-filler components with lower viscosities while aluminum silicate and magnesium silicate will provide polyol-filler components with higher viscosities.

The mixture of polyoxyalkylene polyether polyol and monoethanolamine adduct is reacted with an organic polyisocyanate such that the ratio of isocyanate groups of the polyisocyanate to the hydroxyl groups of the polyether polyol is 1.0:1 to 1.3:1. Polyisocyanates which may be used include aromatic, aliphatic, and cycloaliphatic polyisocyanates and combinations thereof. Representative examples are diisocyanates such a m-phenylene diisocyanate, 2,4-toluenediisocyanate, 2,6-toluenediisocyanate, mixtures of 2,4-toluenediisocyanate and 2,6-toluenediisocyanate, hexamethylene diisocyanate, tetramethylene diisocyanate, 1,4-cyclohexane diisocyanate, hexahydrotoluene diisocyanate, 1,5-naphthalene diisocyanate, 1-methyoxy-2,4-phenylene diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-4,4'-diphenylmethane diisocyanate; the triisocyanates such as 4,4'4''-triphenylmethane triisocyanate, polymethylene polyphenylene polyisocyanate and 2,4,6-toluene triisocyanate; and the tetraisocyanates such as 4,4'-dimethyl-2,2',5,5'-diphenylmethane tetraisocyanate. Especially useful due to their availability and properties are toluene diisocyanate, 4,4'-diphenylmethane diisocyanate and polymethylene polyphenylene polyisocyanate. Polymethylene polyphenylene polyisocyanate, which is most preferred, is a product which results from the phosgenation of an aniline-formaldehyde condensation product; it is sometimes called "crude MDI."

As was previously mentioned, catalysts may be used to increase the reaction rate. If catalysts are used, they are added to the mixture of the polyether polyol and monoethanolamine adduct blend and inorganic filler before the reaction of the mixture with the polyisocyanate.

Urethane catalysts which may be employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, N-ethylmorpholine and diethylethanolamine may also be employed as well as mixtures of any of the above. Generally, the amount of urethane-promoting catalyst employed will be from 0.01 percent to 10 percent by weight based on the weight of the polyether polyol.

Although the polyurethane sealants prepared in accordance with the described process have many uses, they are particularly useful as thermal break barriers when used in the manufacture of metal window and door frames. Other sealants will shrink when they are used for this purpose. Applicants have found that polyurethane sealants prepared in accordance with this invention are shrink resistant or exhibit very little shrinkage, generally less than 2.5 percent.

Thermal break sealants are utilized a part of a composite consisting of a sealant, a metal extrusion and window glass. The sealant separates metal sections, one section of which is exposed to the outside of a building and the other section is exposed to indoor conditions. The sealant serves as a less conductive barrier to the transfer of heat from the warm side of the metal composite to the other. Although the sealant was originally used as a gap filler with good insulating properties, the same sealant is now considered as part of the structural component and desirably has good physical properties such as flexural modulus at elevated temperatures and little or no shrinkage. Thus, in the process of manufacturing metal doors and window frames, a polyurethane thermal break sealant may be employed comprising reacting (a) a polyoxyalkylene polyether polyol other than one derived from monoethanolamine, (b) an ethylene oxide propylene oxide adduct of monoethanolamine having a molecular weight range from about 200 to abut 500, (c) optionally pigment, catalyst and inorganic filler, and (d) an organic polyisocyanate and pouring the liquid into open channels and allowing the mixture to set in a hard thermal break elastomer.

The compositions of the instant invention have also found applications in the manufacture of bowling balls. In the past, bowling balls have been constructed of one or more natural or synthetic materials. These include such materials as natural rubber, based on cis 1,4-polyisoprene or synthetic rubber such as neoprene, butadienestyrene, butyl rubber and the like. Other compositions include polyesters prepared from polycarboxylic acid and polyhydric alcohol such as succinic, maleic, fumaric, phthalic, terephthalic and isophthalic acids and polyhydric alcohols such as ethylene glycol, glycerine, butanediol, sorbitol and the like. Mixtures of acrylic polymers and polyester resins may be employed. Other compositions may employ ethylenically unsaturated polyesters reacted with styrene in the presence of an initiator. The composition may contain inorganic fillers such as calcium carbonate, silica, kaolin clays, calcium silicate and the like. Thus, the composition of the bowling ball may comprise the reaction product of the sealant described above. This comprises the reaction product of (a) a polyoxyalkylene polyether polyol other than one derived from monoethanolamine, (b) an alkylene oxide adduct of monoethanolamine having a molecular weight range from about 200 to about 500, (c) optionally pigment, catalyst, and inorganic filler, and (d) an organic polyisocyanate.

The polyol, the monoethanolamine adduct and polyisocyanate have been described supra.

It is contemplated that the entire bowling ball may be constructed of the composition described, however, preferably the bowling ball comprises an outer spherical solid body of molded material enclosing a central core of heavier material wherein the outer body comprises the reaction product of the polyol, the monoethanolamine and an organic polyisocyanate as previously described.

The properties of the polyurethane sealants in the examples which follow were determined by the following ASTM test methods:

|  | Test Method |
|---|---|
| Tensile Strength | ASTM D638 |
| Elongation | ASTM D638 |
| Flexural Modulus | ASTM D790 |
| Shore D Hardness | ASTM D2240 |
| Heat Distortion | ASTM D648 |
| Notched Izod Impact | ASTKM D256 |

Initial shrinkage was measured by filling aluminum channels 12 inches long by ½ inch wide by ½ inch deep with the polyurethane sealant. The sealant was flush with the ends of the channels after curing before cycling. After filling the channels, the sealants were stored for 24 hours. Then shrinkage measurements were taken at each end of the channel with a caliper. The total shrinkage was computed and this was divided by 12 (the length of the channel) to determine the percent shrinkage.

Polyol A is an propylene oxide ethylene oxide adduct of monoethanolamine, containing 33 percent ethylene oxide, having a hydroxyl number of about 500.

Polyol B is polyoxypropylene glycol having a hydroxyl number of about 56.

Polyol C is a propylene oxide adduct of glycerine having a hydroxyl number of about 58.

Polyol D is a propylene oxide ethylene oxide adduct of a mixture of toluenediamine and ethylene diamine containing about 52 percent propylene oxide, having a hydroxyl number of about 500.

Polyol E is a propylene oxide ethylene oxide adduct of ethylene diamine containing 10 percent ethylene oxide, having a hydroxyl number of about 453.

Polyol F is a propylene oxide adduct of ethylene diamine having a hydroxyl number of about 760.

Polyol G is a propylene oxide ethylene oxide adduct of trimethylolpropane containing 13 percent ethylene oxide, having a hydroxyl number of about 35.

Polyol H is polyol Q which has been reacted with 22 percent 1:1 acrylonitrile:styrene having a hydroxyl number of about 28.

Polyol I is polyol Q which has been reacted with 30 percent 3:1 acrylonitrile:styrene having a hydroxyl number of abut 25.

Polyol J is polyol Q which has been reacted with 21 percent 3:2 acrylonitrile:styrene having a hydroxyl number of about 28.

Polyol K is a propylene oxide ethylene oxide adduct of monoethanolamine containing 26 percent ethylene oxide, having a hydroxyl number of about 500.

Polyol L is a propylene oxide adduct of triethanolamine having a hydroxyl number of about 616.

Polyol M is a propylene oxide adduct of a mixture of sucrose and dipropylene glycol having a hydroxyl number of about 400.

Polyol N is an ethylene oxide adduct of toluenediamine containing 90 percent vicinal isomers, having a hydroxyl number of about 450.

Polyol O is a propylene oxide ethylene oxide adduct of monoethanolamine containing 10 percent ethylene oxide having a hydroxyl number of about 500.

Polyol P is a polyoxypropylene glycol having a hydroxyl number of about 110.

Polyol Q is a propylene oxide ethylene oxide adduct of a mixture of glycerine and propylene glycol containing 14 percent ethylene oxide, the adduct being reacted with sufficient α-glycidyl ether to give an unsaturation of about 0.3 mole unsaturation per mole of polyol, having a hydroxyl number of about 35.

Polyol R is a polyoxypropylene glycol having a hydroxyl number of about 56.

Pigment A is DR-2205 sold by Plasticolors, Inc.

Filler A is a 50:50 mixture of castor oil and powdered Type 3A molecular sieve.

TIPA is triisopropanolamine.

BDO is 1,4-butanediol.

Isocyanate A is polymethylene polyphenylene polyisocyanate.

EXAMPLES 1-28

The polyols in the amounts as tabulated in Table I were blended together in a suitable container with 0.1 pbw of Dow Corning 290 fluid sold by Dow Corning Corp. and allowed to deaerate by placing the blend in an evacuated Bell jar at 0.1 mm pressure. The indicated amounts of polymethylene polyphenylene polyisocyanate were added, the mixture agitated for 20 to 80 seconds and then poured into suitable metal molds. The cast sealant were subsequently removed from the molds and allowed to cure for at least seven days. Physical properties were then determined on the products. Examples 14–18, and 23–27 were also blended with 1.25 parts of a pigment, DR-2205, sold by Plasticolors, Inc., and 3.0 parts of a 50:50 mixture of castor oil and powdered Type 3A molecular sieve. The sieve is sold by Union Carbide Corp.

Example 28 was similar to Example 27 except it did not contain the pigment.

TABLE I

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Formulation, pbw | | | | | | | | | | | | | |
| Polyol A | 60 | 50 | 60 | 50 | 50 | 50 | 50 | 40 | 50 | 70 | 60 | 70 | 70 |
| Polyol B | 40 | 45 | — | — | — | — | — | — | — | — | — | — | — |
| Polyol C | — | — | 40 | 40 | 40 | 40 | 40 | — | — | — | — | — | — |
| Polyol D | — | — | — | 10 | — | — | — | 20 | — | — | — | — | — |
| Polyol E | — | — | — | — | 10 | — | — | — | 10 | — | — | — | — |
| Polyol F | — | — | — | — | — | 10 | — | — | — | — | — | — | — |
| Polyol G | — | — | — | — | — | — | — | 40 | 40 | — | — | — | — |
| Polyol H | — | — | — | — | — | — | — | — | — | 30 | — | — | — |
| Polyol I | — | — | — | — | — | — | — | — | — | — | 40 | 30 | — |
| Polyol J | — | — | — | — | — | — | — | — | — | — | — | — | 30 |
| TIPA | — | — | — | — | — | — | 10 | — | — | — | — | — | — |
| BDO | — | 5 | — | — | — | — | — | — | — | — | — | — | — |
| Isocyanate A | 79 | 84 | 80 | 80 | 79 | 87 | 90 | 80 | 79 | 92 | 80 | 92 | 92 |
| Index | 105 | 105 | 105 | 105 | 105 | 105 | 105 | 105 | 105 | 105 | 105 | 105 | 105 |
| Physical Properties | | | | | | | | | | | | | |
| Tensile Strength, psi | 6200 | 6220 | 6210 | 6390 | 6370 | 5700 | 6890 | 5950 | 4890 | 7620 | 6400 | 7630 | 7810 |

TABLE I-continued

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Elongation, % | 6 | 5 | 4 | 7 | 6 | 6 | 6 | 4 | 16 | 8 | 3 | 4 | 9 |
| Flexural Mod, psi × $10^3$ | | | | | | | | | | | | | |
| 72° F. | 332 | 240 | 277 | 239 | 245 | 255 | 253 | 173 | 189 | 210 | 216 | 261 | 258 |
| 125° F. | 186 | 147 | 139 | 160 | 110 | 191 | 170 | 110 | 125 | 174 | 129 | 185 | 169 |
| 180° F. | 66 | 57 | 60 | 97 | 76 | 160 | 129 | 67 | 53 | 53 | 55 | 104 | 90 |
| Heat Distortion Temp, °F. | | | | | | | | | | | | | |
| 66 psi | 145 | 151 | 140 | 143 | 149 | 165 | 145 | 144 | 149 | 151 | 151 | 175 | 174 |
| Notched Izod Impact | | | | | | | | | | | | | |
| ft./lb./in. | 0.80 | 1.14 | 0.78 | 0.81 | 1.16 | 0.83 | 1.03 | 1.49 | 1.07 | 0.99 | 1.49 | 0.76 | 1.03 |
| Hardness, Shore D | 66 | 64 | 69 | 62 | 64 | 66 | 61 | 51 | 53 | 62 | 53 | 57 | 56 |
| Initial Shrinkage, % | 1.7 | 1.7 | 2.1 | 2.1 | 2.1 | 2.1 | 1.0 | 2.1 | 2.1 | 2.4 | 2.1 | 2.1 | 2.1 |

TABLE II

| Example | 14 | 15 | 16 | 17 | 18 | 19 | 20 | 21 |
|---|---|---|---|---|---|---|---|---|
| Formulation, pbw | | | | | | | | |
| Polyol K | 60 | 50 | 50 | 50 | 50 | 45 | 45 | 50 |
| Polyol B | 40 | 50 | 45 | 40 | 45 | 50 | 50 | 45 |
| Polyol L | — | — | — | — | 5 | — | — | — |
| Polyol E | — | — | — | — | — | 5 | — | — |
| Polyol F | — | — | — | — | — | — | 5 | — |
| Polyol M | — | — | — | — | — | — | — | 5 |
| Polyol N | — | — | — | — | — | — | — | — |
| Polyol O | — | — | — | — | — | — | — | — |
| Polyol C | — | — | — | — | — | — | — | — |
| Polyol D | — | — | — | — | — | — | — | — |
| Polyol G | — | — | — | — | — | — | — | — |
| Polyol P | — | — | — | — | — | — | — | — |
| BDO | — | — | 5 | 10 | — | — | — | — |
| TIPA | — | — | — | — | — | — | — | — |
| Isocyanate A | 83 | 71 | 86 | 102 | 79 | 71 | 75 | 76 |
| Index | 110 | 110 | 110 | 110 | 110 | 110 | 110 | 110 |
| Physical Properties | | | | | | | | |
| Tensile Str., psi | 6400 | 6510 | 6430 | 7390 | 6070 | 4000 | 4140 | 5700 |
| Yield Str., psi | 6450 | — | — | — | — | — | — | 6030 |
| Elongation, % | 8 | 10 | 5 | 6 | 4 | 6 | 4 | 9 |
| Flexural Mod, psi × $10^3$ | | | | | | | | |
| 72° F. | 258 | 152 | 238 | 270 | 229 | 173 | 190 | 235 |
| 125° F. | 160 | 94 | 168 | 181 | 170 | 118 | 131 | 147 |
| 180° F. | 76 | 47 | 105 | 127 | 107 | 59 | 94 | 69 |
| Heat Distortion Temp. °F. | | | | | | | | |
| 66 psi | 158 | 140 | 155 | 171 | 146 | 138 | 146 | 142 |
| Notched Izod Impact | | | | | | | | |
| ft.lb./in. | 0.78 | 0.73 | 0.73 | 0.73 | 0.80 | 0.72 | 0.55 | 1.10 |
| Hardness, Shore D | 64 | 58 | 62 | 64 | 63 | 59 | 63 | 63 |
| Initial Shrinkage, % | 1.0 | 1.4 | 1.7 | 1.7 | 2.1 | 1.4 | 1.0 | 1.7 |

| Example | 22 | 23 | 24 | 25 | 26 | 27 | 28 |
|---|---|---|---|---|---|---|---|
| Formulation, pbw | | | | | | | |
| Polyol K | 50 | — | 50 | 50 | 50 | 50 | 50 |
| Polyol B | 45 | 40 | — | — | — | — | — |
| Polyol L | — | — | — | — | — | — | — |
| Polyol E | — | — | — | 10 | — | — | — |
| Polyol F | — | — | — | — | 10 | — | — |
| Polyol M | — | — | — | — | — | — | — |
| Polyol N | 5 | — | — | — | — | — | — |
| Polyol O | — | 60 | — | — | — | — | — |
| Polyol C | — | — | 40 | 40 | 40 | 40 | — |
| Polyol D | — | — | 10 | — | — | — | — |
| Polyol G | — | — | — | — | — | — | 30 |
| Polyol P | — | — | — | — | — | — | 20 |
| BDO | — | — | — | — | — | — | — |
| TIPA | — | — | — | — | — | 10 | — |
| Isocyanate A | 76 | 85 | 85 | 85 | 90 | 118 | 82 |
| Index | 110 | 110 | 110 | 110 | 110 | 110 | 125 |
| Physical Properties | | | | | | | |
| Tensile Str., psi | 6000 | 7490 | 6850 | 6850 | 8240 | 8000 | 4580 |
| Yield Str., psi | 6130 | 8930 | — | — | — | — | 5000 |
| Elongation, % | 20 | 9 | 6 | 6 | 7 | 4 | 27 |
| Flexural Mod, psi × $10^3$ | | | | | | | |
| 72° F. | 211 | 317 | 235 | 235 | 273 | 255 | 178 |
| 125° F. | 146 | 71 | 143 | 143 | 191 | 142 | 62 |
| 180° F. | 117 | 6.2 | 26 | 26 | 80 | 36 | 15 |
| Heat Distortion Temp. °F. | | | | | | | |

TABLE II-continued

| | | | | | | | |
|---|---|---|---|---|---|---|---|
| 66 psi | 142 | 136 | 160 | 160 | 189 | 138 | 134 |
| Notched Izod Impact ft.lb./in. | 1.00 | 0.74 | 0.71 | 0.71 | 0.63 | 0.60 | 1.82 |
| Hardness, Shore D | 68 | 67 | 69 | 69 | 72 | 65 | 79 |
| Initial Shrinkage, % | 2.1 | 2.1 | 0.7 | 1.4 | 1.0 | 1.7 | 1.7 |

EXAMPLES 29–32

The bowling balls of Examples 29–32 were prepared employing the formulations as shown in Table III. A core ball prepared from a styrenated polyester containing calcium carbonate was placed into a bowling ball mold which was treated with a mold release. A Puromat 30/2 high pressure machine was loaded with the ingredients listed in Table III. The temperature of the mixture was about 83° F. The mold was injected with the mixture of polyols and isocyanate 1:1.1 ratio in an amount of about 5 to 6 pounds. The pump pressures were about 175 bars and tank pressure about 4.5 bars. After about two hours, the molded balls were removed from the mold. All the balls exhibited shiny appearances with no surface blemishes.

TABLE III

| Formulation, pbw | Examples | | | |
|---|---|---|---|---|
| | 29 | 30 | 31 | 32 |
| Polyol R | 10 | 10 | 10 | 10 |
| Polyol P | 40 | 40 | 40 | 40 |
| Polyol K | 50 | 50 | 50 | 50 |
| Pigment A | — | — | 1.25 | 1.25 |
| Filler A | 3.0 | 3.0 | 3.0 | 3.0 |
| Isocyanate Index | 108 | 108 | 114 | 114 |

The embodiments of the invention in which an exclusive privilege or property is claimed are defined as follows:

1. A non-cellular polyurethane composition comprising the reaction product of
   (a) a polyoxyalkylene polyether polyol other than one derived from monoethanolamine,
   (b) an ethylene oxide propylene oxide adduct of monoethanolamine having a molecular weight range from about 200 to about 500,
   (c) optionally pigment, catalyst and inorganic filler, and
   (d) an organic polyisocyanate.

2. The composition of claim 1 wherein the ratio of polyol to the adduct of monoethanolamine is from about 2.5:1 to 1:1.5.

3. The composition of claim 1 wherein the ratio of polyol to the adduct of monoethanolamine is from 2.5:1 to 1:1.

4. The composition of claim 1 wherein the organic polyisocyanate is polymethylene polyphenylene polyisocyanate.

5. A process for preparing a polyurethane composition comprising reacting
   (a) a polyoxyalkylene polyether polyol other than one derived from monoethanolamine,
   (b) an ethylene oxide propylene oxide adduct of monoethanolamine having a molecular weight range from about 200 to about 500,
   (c) optionally pigment, catalyst and inorganic filler, and
   (d) an organic polyisocyanate.

6. The process of claim 5 wherein the ratio of polyol to the adduct of monoethanolamine is from about 2.5:1 to 1:1.5.

7. The process of claim 5 wherein the ratio of polyol to the adduct of monoethanolamine is from 2.5:1 to 1:1.

8. The process of claim 5 wherein the organic polyisocyanate is polymethylene polyphenylene polyisocyanate.

9. In the process of manufacturing metal door frames and windows incorporating a thermal break composition, the improvement comprising using a polyurethane sealant composition prepared by reacting
   (a) a polyoxyalkylene polyether polyol other than one derived from monoethanolamine,
   (b) an ethylene oxide propylene oxide adduct of monoethanolamine having a molecular weight range from about 200 to about 500,
   (c) optionally pigment, catalyst and inorganic filler, and
   (d) an organic polyisocyanate.

10. The process of claim 9 wherein the ratio of polyol to the adduct of monoethanolamine is from about 2.5:1 to 1:1.5.

11. The process of claim 9 wherein the ratio of polyol to the adduct of monoethanolamine is from 2.5:1 to 1:1.

12. The process of claim 9 wherein the organic polyisocyanate is polymethylene polyphenylene polyisocyanate.

13. In a process for the manufacture of a bowling ball comprising an outer spherical solid body of molded material enclosing a central core of heavier material, the improvement comprises the outer body comprising the reaction product of
   (a) a polyoxyalkylene polyether polyol other than one derived from monoethanolamine,
   (b) an ethylene oxide propylene oxide adduct of monoethanolamine having a molecular weight range from about 200 to about 500,
   (c) optionally pigment, catalyst and inorganic filler, and
   (d) an organic polyisocyanate.

14. The process of claim 13 wherein the ratio of polyol to the adduct of monoethanolamine is from about 2.5:1 to 1:1.5.

15. The process of claim 13 wherein the ratio of polyol to the adduct of monoethanolamine is from about 2.5:1 to 1:1.

16. The process of claim 13 wherein the organic polyisocyanate is polymethylene polyphenylene polyisocyanate.

17. The product prepared by the process of claim 9.
18. The product prepared by the process of claim 13.
19. The product prepared by the process of claim 14.

* * * * *